US012197158B2

(12) United States Patent
Koyanagi et al.

(10) Patent No.: US 12,197,158 B2
(45) Date of Patent: Jan. 14, 2025

(54) STIFFNESS MEASURING DEVICE, IMAGE FORMING SYSTEM, AND STIFFNESS MEASURING METHOD

(71) Applicant: KONICA MINOLTA, INC., Tokyo (JP)

(72) Inventors: Yasuo Koyanagi, Hachioji (JP); Kazumichi Yoshida, Hino (JP); Yoshihito Sasamoto, Hachioji (JP); Kazutoshi Yoshimura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/220,300

(22) Filed: Jul. 11, 2023

(65) Prior Publication Data

US 2024/0036503 A1 Feb. 1, 2024

(30) Foreign Application Priority Data

Aug. 1, 2022 (JP) ................................ 2022-122804

(51) Int. Cl.
*G03G 15/00* (2006.01)

(52) U.S. Cl.
CPC ..... *G03G 15/5029* (2013.01); *G03G 15/6594* (2013.01); *B65H 2553/61* (2013.01); *B65H 2553/82* (2013.01); *G03G 2215/00738* (2013.01)

(58) Field of Classification Search
CPC ........... G03G 15/5029; G03G 15/6588; G03G 15/6594; G03G 2215/00738; G03G 2215/00481; G03G 2215/00485; G03G 2215/00628; B65H 2401/23; B65H 2511/13; B65H 2515/81; B65H 2553/61; B65H 2553/82
USPC ............................... 399/45, 389; 271/265.04
See application file for complete search history.

(56) References Cited

U.S. PATENT DOCUMENTS

| | | | | |
|---|---|---|---|---|
| 7,856,340 | B2 * | 12/2010 | Kaneko | G01D 1/18 73/12.09 |
| 2006/0275045 | A1 * | 12/2006 | Kawasaki | G03G 15/5029 399/45 |
| 2015/0296091 | A1 * | 10/2015 | Atay | H04N 1/00092 358/1.12 |
| 2019/0064718 | A1 * | 2/2019 | Mitsui | B65H 7/20 |
| 2022/0187751 | A1 * | 6/2022 | Tomishima | G03G 15/6564 |
| 2022/0191340 | A1 | 6/2022 | Seki et al. | |

FOREIGN PATENT DOCUMENTS

JP 2010049178 A 3/2010

* cited by examiner

*Primary Examiner* — Robert B Beatty
(74) *Attorney, Agent, or Firm* — Holtz, Holtz & Volek PC

(57) ABSTRACT

A stiffness measuring device includes a holding portion that holds a recording material so that a recording surface of the recording material is substantially parallel to a vertical direction, a pressing portion, and a stiffness acquiring section. The pressing portion presses a measurement point located on a lower side in the vertical direction than the portion of the recording material held by the holding portion. The stiffness acquiring section measures a reaction force obtained when the measurement point is pressed by the pressing portion and acquires the measured reaction force as the stiffness of the recording material.

11 Claims, 6 Drawing Sheets

STIFFNESS MEASURING DEVICE, IMAGE FORMING SYSTEM, AND STIFFNESS MEASURING METHOD

TECHNICAL FIELD

The present invention relates to a stiffness measuring device, an image forming system, and a stiffness measuring method.

BACKGROUND ART

In an image forming apparatus that forms an image on a sheet as a recording medium, a technology is known in which the stiffness of the sheet is detected and various control parameters are set based on the detection result. PTL 1 discloses a technology for detecting stiffness of sheet. An image forming apparatus described in PTL 1 presses a sheet being conveyed against a lever, and detects a displacement amount of the lever at that time as the stiffness of the sheet.

CITATION LIST

Patent Literature

PTL 1: Japanese Unexamined Patent Publication No. 2010-049178

SUMMARY OF INVENTION

Technical Problem

However, the image forming apparatus described in PTL 1 measures the stiffness of the sheet while holding the sheet at a predetermined position during conveyance in the horizontal direction. Therefore, the measurement result of the stiffness includes the effect of gravity applied to the sheet. Accordingly, the image forming apparatus disclosed in PTL 1 has a problem that the stiffness of the sheet cannot be accurately measured.

To cancel out the effect of gravity, for example, it is conceivable to lift the sheet by an amount corresponding to the sag due to the effect of gravity. However, it is difficult to accurately lift only the amount corresponding to the sag due to the effect of gravity. Further, since the effect of gravity increases as the distance from the portion that holds the sheet to the lever increases, it is difficult to accurately grasp the effect of gravity required for the cancellation.

Objects of the present invention are to provide a stiffness measuring device capable of measuring the stiffness of a recording material such as a sheet with high accuracy, an image forming system including the stiffness measuring device, and a stiffness measuring method.

Solution to Problem

In order to realize at least one of the above-described objects, according to an aspect of the present invention, there is provided a stiffness measuring device that includes a holding portion that holds a recording material in a posture in which a recording surface is substantially parallel to a vertical direction, a pressing portion, and a stiffness acquiring section. The pressing portion presses a measurement point located on a lower side in the vertical direction than the portion of the recording material held by the holding portion. The stiffness acquiring section measure a reaction force obtained when the measurement point is pressed by the pressing portion and acquires the measured reaction force as the stiffness of the recording material.

An image forming system reflecting an aspect of the present invention includes an image forming section that forms an image on a recording material, a recording material storage portion capable of storing the recording material, and a recording material conveyance path provided between the recording material storage portion and the image forming section. Further, the image forming system of the present invention includes the above-described stiffness measuring device that is disposed in the recording material conveyance path and measures the stiffness of the recording material, and a controller that sets an image forming parameter in accordance with the measurement result of the stiffness measuring device.

A stiffness measuring method reflecting an aspect of the present invention is a method in which a holding portion holds a recording material so that a recording surface of the recording material is substantially parallel to a vertical direction. Next, the pressing portion presses a measurement point positioned on the lower side in the vertical direction than the portion of the recording material held by the holding portion. Then, a stiffness acquiring section measures a reaction force obtained when the measurement point is pressed by the pressing portion, and acquires the measured reaction force as the stiffness of the recording material.

DESCRIPTION OF EMBODIMENTS

Figure 1:
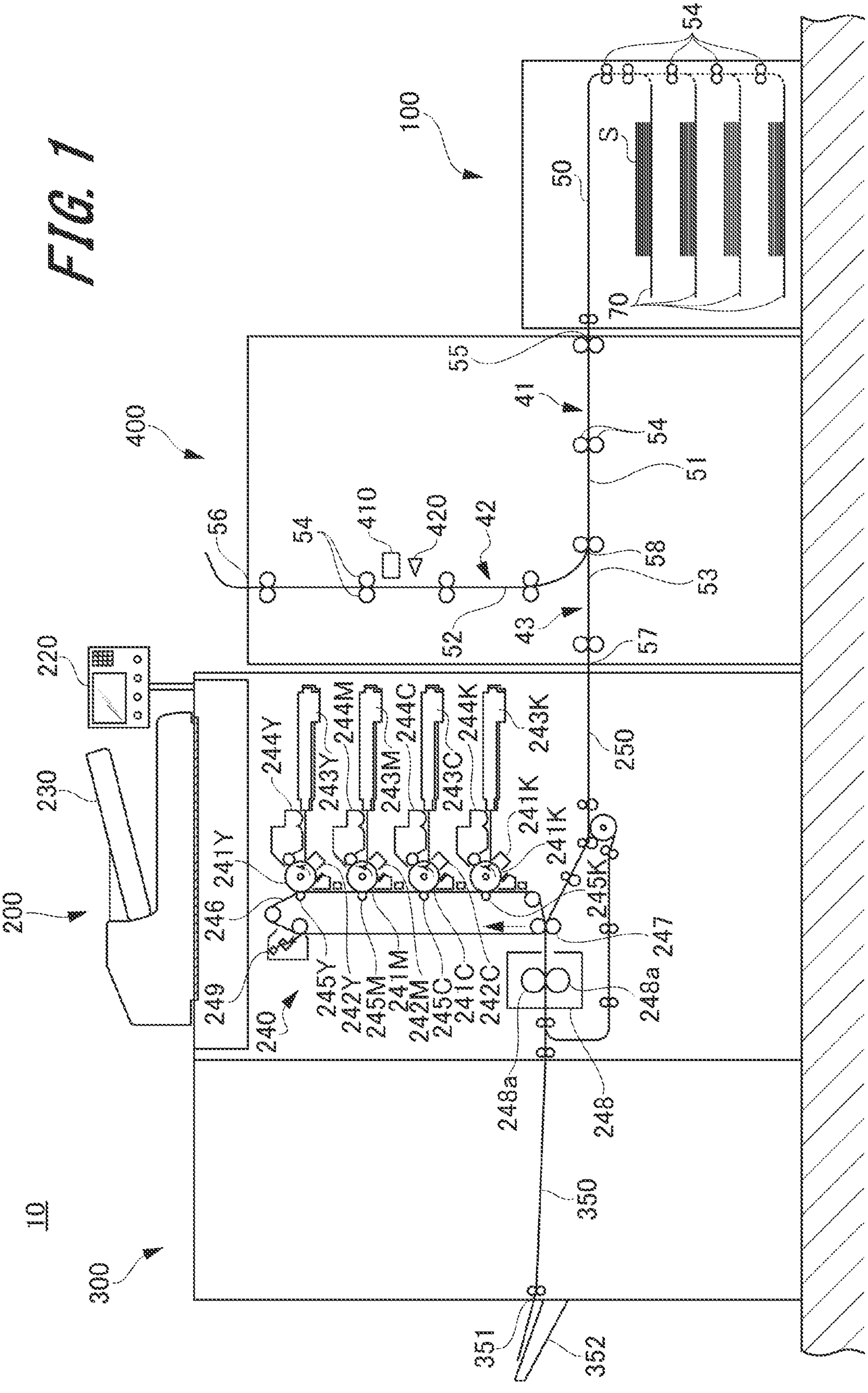
FIG. 1 is a diagram illustrating a schematic configuration of an image forming system according to a first embodiment of the present invention.

Hereinafter, embodiments to which the present invention is applied will be described in detail with reference to the drawings. In this specification and the drawings, substantially the same components are denoted by the same reference numerals, and redundant description will be omitted.

1. First Embodiment

First, an image forming system according to a first embodiment of the present invention will be described below with reference to FIGS. 1 to 6.

<Configuration of Image Forming System>

First, a configuration of an image forming system according to the first embodiment will be described with reference to FIG. 1.

FIG. 1 is a diagram illustrating a schematic configuration of an image forming system according to the first embodiment.

As shown in FIG. 1, an image forming system 10 includes a recording material feeding device 100, a recording material conveying device 400, an image forming apparatus 200, and a post-processing device 300.

In the image forming system 10, when an image is formed on a recording material S, first, the recording material S is supplied from the recording material feeding device 100 to the recording material conveying device 400. Then, the recording material conveying device 400 conveys the recording material S to the image forming apparatus 200. Note that the recording material conveying device 400 includes a stiffness measuring device 410 that measures the stiffness of the recording material S.

Next, the image forming apparatus 200 forms an image on the recording material S supplied from the recording material conveying device 400. Then, the image forming apparatus 200 sends the recording material S on which the image is formed to the post-processing device 300. The post-processing device 300 performs predetermined post-processing on the recording material S on which the image is formed. Thereafter, the post-processing device 300 ejects the recording material S.

[Recording Material Feeding Device]

The recording material feeding device 100 stores the recording material S for image formation. Upon receiving an image forming job from a controller 90 (to be described later) of the image forming system 10, the recording material feeding device 100 supplies the recording material S corresponding to the image forming job to the recording material conveying device 400. The recording material feeding device 100 includes a conveying portion 50 and a recording material feeding section 70.

The recording material feeding section 70 includes a plurality of recording material storage portions. The recording materials S of different types and sizes are individually stored in the plurality of recording material storage portions. In the present embodiment, the recording material S is a recording medium on which an image is to be formed, and is, for example, a sheet. The recording material S may be anything other than a sheet as long as the stiffness thereof can be measured.

The conveying portion 50 includes a plurality of take-out rollers for taking out the recording material S from the recording material feeding section 70, and a plurality of conveying rollers 54. In FIG. 1, the take-out rollers are not shown. The plurality of conveying rollers 54 are arranged in a predetermined recording material conveyance path. The plurality of conveying rollers 54 convey the recording material S taken out from the recording material feeding section 70 to the recording material conveying device 400 one by one.

[Recording Material Conveying Device]

The recording material conveying device 400 includes a carry-in port a first conveying portion 51, a second conveying portion 52, a third conveying portion 53, a ejection portion 56, a carry-out port 57, the stiffness measuring device 410, and a recording material detector 420.

The carry-in port 55 carries in the recording material S supplied from the recording material feeding device 100. The first conveying portion 51, the second conveying portion 52, and the third conveying portion 53 convey the recording material S carried in from the carry-in port 55 to the ejection portion 56 or the carry-out port 57. The first conveying portion 51, the second conveying portion 52, and the third conveying portion 53 include a plurality of conveying rollers 54 for conveying the recording material S.

The stiffness measuring device 410 is a device that acquires the stiffness of the recording material S. The stiffness of the recording material S is an index indicating resistance to bending of the recording material S, and can be expressed using various physical quantities. The recording material detector 420 detects that the recording material S has been conveyed to a position where the stiffness is measured. Hereinafter, the position for measuring the stiffness of the recording material S is referred to as a "stiffness measurement position".

The recording material conveying device 400 includes a branching portion 58 by which the conveyance path of the recording material S is branched. The recording material conveying device 400 includes a first conveyance path 41 located on the upstream side of the branching portion 58 in the recording material conveyance direction, and a second conveyance path 42 and a third conveyance path 43 located on the downstream side of the branching portion 58 in the recording material conveyance direction.

The first conveyance path 41 is a path from the carry-in port 55 to the branching portion 58. The first conveying portion 51 is disposed in the first conveyance path 41. The first conveying portion 51 conveys the recording material S along the first conveyance path 41. The recording material S conveyed along the first conveyance path 41 is guided to the second conveyance path 42 or the third conveyance path 43 by the branching portion 58.

The second conveyance path 42 is a path from the branching portion 58 to the ejection portion 56. The second conveying portion 52 is disposed in the second conveyance path 42. The second conveying portion 52 conveys the recording material S along the second conveyance path 42. The stiffness measuring device 410 measures the stiffness of the recording material S whose conveyance is stopped in the middle of the second conveyance path 42. The recording material S whose stiffness has been measured by the stiffness measuring device 410 is again conveyed along the second conveyance path 42 and is ejected from the ejection portion 56.

The third conveyance path 43 is a path from the branching portion 58 to the carry-out port 57. The third conveying portion 53 is disposed in the third conveyance path 43. The third conveying portion 53 conveys the recording material S along the third conveyance path 43. The recording material S conveyed along the third conveyance path 43 is ejected from the carry-out port 57. The recording material S ejected from the carry-out port 57 is supplied to the image forming apparatus 200.

[Image Forming Apparatus]

The image forming apparatus 200 includes an operation display unit 220, a scanner 230, an image forming section 240, and a conveying portion 250.

The operation display unit 220 includes an operation part and a display part. The display part is, for example, a display device such as a liquid crystal display (LCD). The display part displays various screens according to an instruction of a display signal input from the controller 90 (see FIG. 2), which will be described later. The operation part includes a touch screen formed so as to cover the display screen of the display part, and various operation buttons such as numeric buttons and a start button. The operation part accepts an operation instruction from a user. The operation part outputs an operation signal based on the operation of the user to the controller 90, which will be described later.

The scanner 230 includes an automatic document feeder called an ADF (Auto Document Feeder) and a document image scanning device which is a scanner. The automatic document feeder conveys a document placed on a document tray by a conveyance mechanism and sends the document to the document image scanning device. The document image scanning device optically scans a document conveyed onto a contact glass by the automatic document feeder or a document placed on the contact glass by the user, and forms an image of reflected light from the document on a light receiving surface of a charge coupled device (CCD) sensor or the like to read the image of the document. The scanner 230 generates image data based on the result of reading by the document image scanning device.

The image forming section 240 forms an image on the recording material S based on image data. The image forming section 240 includes photosensitive drums 241Y, 241M, 241C, and 241K, charging sections 242Y, 242M, 242C, 242K, exposure sections 243Y, 243M, 243C and 243K, developing sections 244Y, 244M, 244C and 244K, and primary transfer rollers 245Y, 245M, 245C and 245K, corresponding to yellow (Y), magenta (M), cyan (C), and black (K). The image forming section 240 also includes an intermediate transfer belt 246, a secondary transfer roller 247, and a fixing section 248.

Hereinafter, the photosensitive drums 241Y, 241M, 241C, and 241K are collectively referred to as "photoconductor drum 241". The charging sections 242Y, 242M, 242C, and 242K are collectively referred to as "charging section 242", and the exposure sections 243Y, 243M, 243C, and 243K are collectively referred to as "exposure section 243". Further, the developing sections 244Y, 244M, 244C, and 244K are collectively referred to as "developing section 244", and the primary transfer rollers 245Y, 245M, 245C, and 245K are collectively referred to as "primary transfer roller 245".

The photosensitive drum 241 is an image bearing member that carries a toner image thereon. The photosensitive drum 241 is rotated by driving of a photoreceptor drive motor (not illustrated). Around the photosensitive drum 241, a charging section 242, an exposure section 243, and a developing section 244 are disposed in order from upstream to downstream in the rotation direction of the photosensitive drums 241. The charging section 242 uniformly charges the photosensitive drum 241.

The exposure section 243 includes a laser light source, a polygon mirror, and a lens. The exposure section 243 forms an electrostatic latent image by scanning and exposing the surface of the photosensitive drum 241 with a laser beam. The scanning exposure by the exposure section 243 is performed based on image data read by the scanner 230 or image data received from an external device.

The developing section 244 causes the toner of each color to adhere to the electrostatic latent image formed on the photosensitive drum 241 to perform development. Thus, a toner image is formed on the image bearing surface of the photosensitive drum 241. That is, a yellow toner image is formed on the image bearing surface of the photosensitive drum 241Y. A magenta toner image is formed on the image bearing surface of the photosensitive drum 241M. A cyan toner image is formed on the image bearing surface of the photosensitive drum 241C. A black toner image is formed on the image bearing surface of the photosensitive drum 241K.

The intermediate transfer belt 246 is wound around a plurality of belt support rollers and formed in a loop shape. The primary transfer roller 245, the secondary transfer roller 247, a charge eliminating roller (not shown), and a cleaning unit 249 are disposed in a moving path of the intermediate transfer belt 246.

An outer circumferential surface of the intermediate transfer belt 246 is an image bearing surface. The outer circumferential surface of the intermediate transfer belt 246 is in contact with the outer circumferential surface of the photosensitive drum 241. The intermediate transfer belt 246 rotates in a direction opposite to the direction in which photosensitive drum 241 rotates. Specifically, the photosensitive drum 241 rotates in a counterclockwise direction in FIG. 1, and the intermediate transfer belt 246 rotates in a clockwise direction in FIG. 1.

The primary transfer roller 245 is disposed at a position facing the photosensitive drum 241. The primary transfer roller 245 is disposed on the inner peripheral side of the intermediate transfer belt 246, and sandwiches the intermediate transfer belt 246 between itself and the opposing photosensitive drum 241.

The primary transfer roller 245 transfers the toner deposited on the image bearing surface of the photosensitive drum 241 to the image bearing surface of the intermediate transfer belt 246 by applying an electric charge having a polarity opposite to that of the toner to the intermediate transfer belt 246. As a result, a color toner image in which the toner images of four colors are superimposed is formed on the image bearing surface of the intermediate transfer belt 246.

The secondary transfer roller 247 collectively transfers the color toner image on the image bearing surface of the intermediate transfer belt 246 onto one recording surface of the recording material S. The secondary transfer roller 247, and the belt support roller sandwich the intermediate transfer belt 246. The position where the secondary transfer roller 247 and the belt support roller face each other is a transfer position where the toner image transferred on the image bearing surface of the intermediate transfer belt 246 is transferred to the recording material S.

In the rotational direction of the intermediate transfer belt 246, the cleaning unit 249 is disposed upstream from the primary transfer rollers 245 and downstream from the charge eliminating roller (not shown). The cleaning unit 249 removes the toner remaining on the image carrying surface of the intermediate transfer belt 246.

A fixing section 248 includes a fixing roller 248*a* and a pressing roller 248*b*. A heater is built in the fixing roller 248*a*. The pressing roller 248*b* is pressed against the fixing roller 248*a*. As a result, the fixing roller 248*a* and the pressing roller 248*b* are press-contacted to each other, and a fixing nip portion is formed at this press-contacted portion. The recording material S is heated and pressurized when passing through the fixing nip portion. As a result, the toner image transferred to the recording material S is fixed.

The conveying portion 250 includes a plurality of conveying rollers 54 for conveying the recording material S along a predetermined conveying path. The conveying portion 250 conveys the recording material S supplied from the recording material conveying device 400 to the transfer position. Further, the conveying portion 250 conveys the recording material S after image formation to the post-processing device 300.

[Post-Processing Device]

The recording material S on which the image has been formed by the image forming apparatus 200 is carried into the post-processing device 300. The post-processing device 300 includes a plurality of post-processing units, a conveying portion 350, an ejection portion 351, and a sheet ejection tray 352.

After receiving the post-processing job from the controller 90, which will be described later, the post-processing device 300 performs predetermined post-processing in a post-processing unit specified by the post-processing job. Example of the post-processing include perforation processing, folding processing, foil stamping, binding, trimming processing, staple, gluing, binding and the like.

The conveying portion 350 includes a plurality of conveying rollers (not illustrated) for conveying the recording material S along a predetermined conveyance path. The conveying portion 350 conveys the recording material S supplied from the image forming apparatus 200 to a post-processing unit corresponding to the type of post-processing to be executed. Further, the conveying portion 350 conveys the recording material S after the post-processing and ejects the recording material S from the ejection portion 351. The recording material S ejected from the ejection portion 351 is placed on the sheet ejection tray 352.

<System Block Diagram>

Next, an example of the configuration of system of the image forming system 10 will be described referring to FIG. 2.

Figure 2:
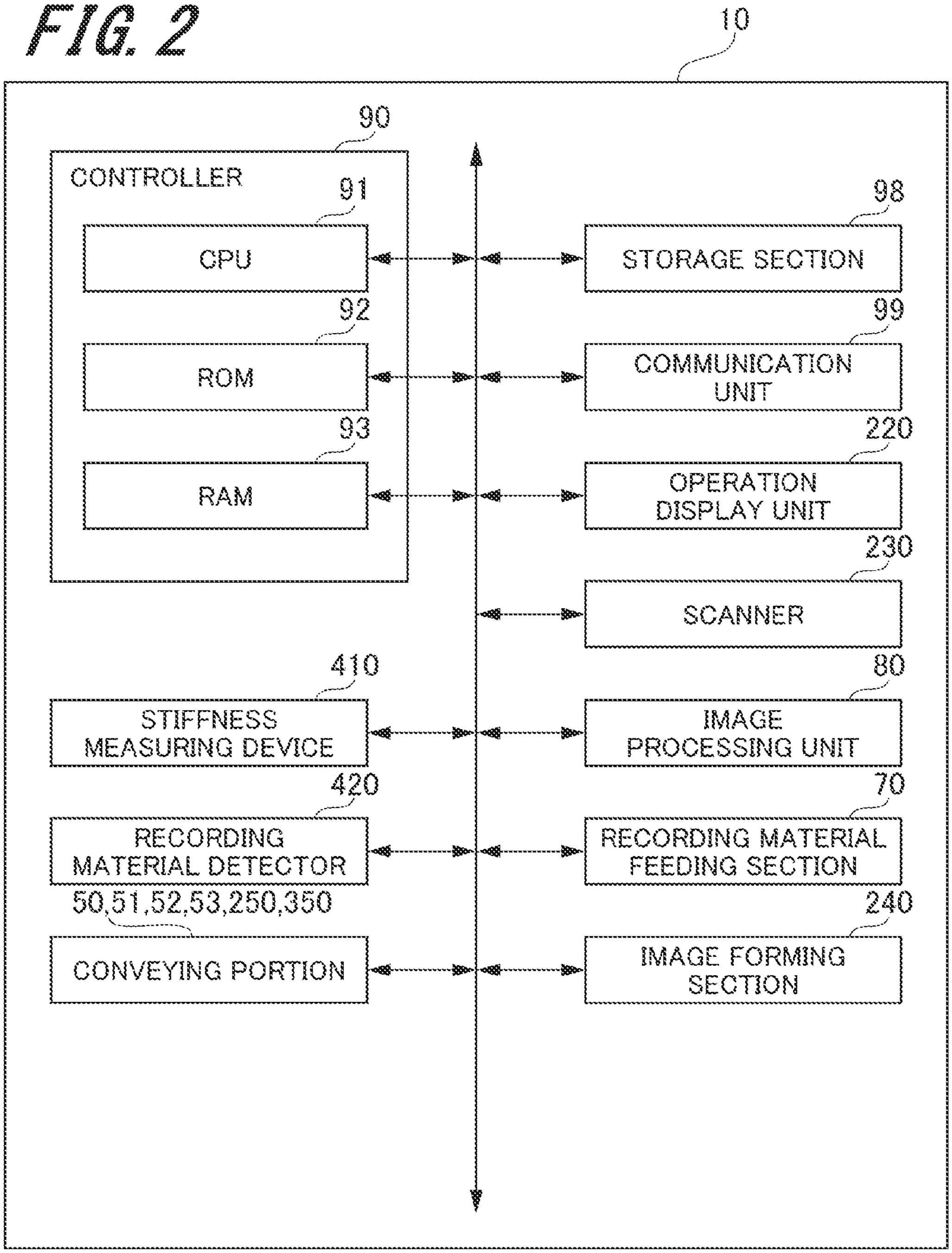
FIG. 2 is a system block diagram of the image forming system according to the first embodiment of the present invention.

FIG. 2 is a system block diagram of the image forming system 10.

As illustrated in FIG. 2, the image forming system 10 includes the controller 90, a storage section 98, a communication unit 99, the operation display unit 220, the scanner 230, an image processing unit the recording material feeding section 70, the image forming section 240, the stiffness measuring device 410, the recording material detector 420, and the conveying portions 51, 52, 53, 250, and 350. In the following description, the same configuration as that of the image forming system 10 illustrated in FIG. 1 will not be described.

The controller 90 includes, for example, a central processing unit (CPU) 91, a read only memory (ROM) 92, a random access memory (RAM) 93, and the like.

The CPU 91 reads various processing programs stored in the ROM 92, develops them in the RAM 93, and centrally controls the operation of each section of the image forming system 10 according to the developed programs.

The ROM92 stores various processing programs for controlling each section of the image forming system 10, parameters and tables necessary for executing the programs, and various files.

The RAM 93 is, for example, a volatile semiconductor memory. In various types of processing executed by the CPU 91, the RAM 93 forms a work area for temporarily storing various processing programs, input or output data, parameters and the like read from the ROM 92.

The storage section 98 stores, for example, image data or the like received from an external device. In addition, the storage section 98 stores various processing programs executed by the CPU91, information regarding processing functions of the apparatus necessary for executing the programs, image date read by the scanner 230, image date input from a client device (not shown) or the like, the stiffness of the recording material S measured by the stiffness measuring device 410, and the like. The storage section 98 is, for example, a nonvolatile memory such as a hard disk drive (HDD), a solid state drive (SSD), or a flash memory.

The communication unit 99 includes a network interface card (NIC), a modem, and the like. The communication unit 99 connects the recording material feeding device 100, the recording material conveying device 400, the image forming apparatus 200, the post-processing device 300, and the stiffness measuring device 410 to a communication network such as a local area network (LAN) or a wide area network (WAN). The communication unit 99 transmits various data to an external information device. Further, the communication unit 99 receives various data from the external information device. The external information device is, for example, the client device.

As described above, the operation display unit 220 functions as the display part and the operation part. The display part displays various operation screens in accordance with a display control signal input from the controller 90. The operation part receives various input operations performed by a user and outputs operation signals corresponding to the various input operations to the controller 90.

The scanner 230 outputs a read analog image signal to the image processing unit 80.

The image processing unit 80 includes a circuit for performing analog-digital conversion and a circuit for performing digital image processing, and the like. The image processing unit 80 performs A/D conversion processing on the analog image signal supplied from the scanner 230 to generate digital image data. The image processing unit 80 also analyzes a print job acquired from the external information device, and rasterizes each page of the document to generate digital image data. Furthermore, the image processing unit 80 performs image processing such as color conversion processing, correction processing according to initial setting or user setting, and compression processing on the image data as necessary. The correction according to the user setting is, for example, shading correction. The image processing unit 80 outputs the image data after the image processing to the image forming section 240.

The stiffness measuring device 410 is disposed in the recording material conveying device 400 (see FIG. 1). Upon receipt of a stiffness measurement signal output from the controller 90, the stiffness measuring device 410 measures the stiffness of the recording material S. The stiffness measuring device 410 outputs the measurement result to the controller 90.

The recording material detector 420 is disposed in the recording material conveying device 400 (see FIG. 1). The recording material detector 420 detects that the recording material S is placed at the stiffness measurement position. The recording material detector 420 outputs the detection result to the controller 90.

<Functional Configuration of Controller>

Next, the functional configuration of the controller 90 will be described with reference to FIG. 3.

Figure 3:
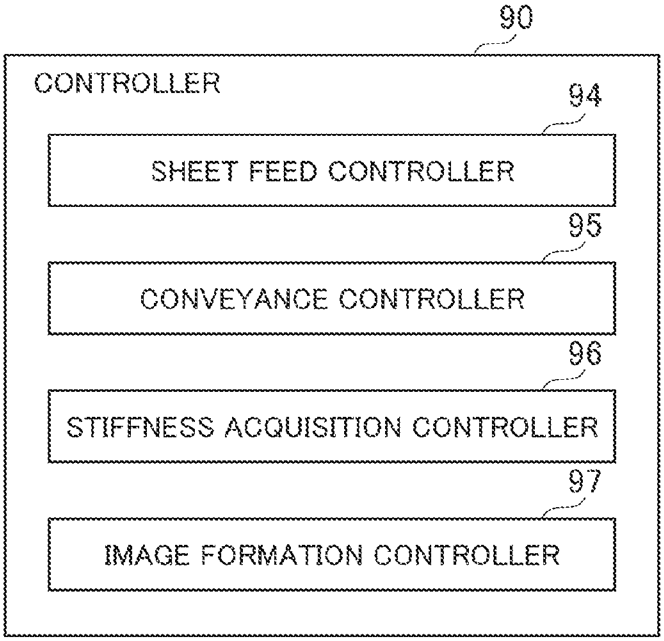
FIG. 3 is a functional block diagram of a controller in the image forming system according to the first embodiment of the present invention.

FIG. 3 is a functional block diagram of the controller 90.

As illustrated in FIG. 3, the controller 90 includes a sheet feed controller 94, a conveyance controller 95, a stiffness acquisition controller 96, and an image formation controller 97.

The sheet feed controller 94 controls supply of the recording material S from the recording material feeding section 70 to the conveying portion 50 in the recording material feeding device 100. The sheet feed controller 94 supplies the recording material S to the conveying portion 50 in accordance with the conveyance control for the recording material S by the conveyance controller 95.

The conveyance controller 95 controls driving of the conveying portions 50, 51, 52, 53, 250, and 350 provided in the recording material feeding device 100, the recording material conveying device 400, the image forming apparatus 200, and the post-processing device 300. As a result, the recording material S is conveyed to each portion of the image forming system 10.

Further, the conveyance controller 95 controls the conveyance mechanism such as the branching portion 58 of the recording material conveying device 400 to change the conveyance path of the recording material S.

When conveying a plurality of recording materials S in accordance with an image forming job, the conveyance controller 95 guides at least one recording material S to the second conveyance path 42 of the recording material conveying device 400. The second conveyance path 42 is a path along which the second conveying portion 52 conveys the recording material S. Then, the conveyance controller 95 controls the second conveying portion 52 to dispose the recording material S at the stiffness measurement position in the second conveyance path 42. The stiffness of the recording material S disposed at the stiffness measurement position is measured by the stiffness measuring device 410.

The conveyance controller 95 corrects control parameters relating to the conveyance of the recording material S in accordance with the stiffness of the recording material S. A specific example of the control parameter related to conveyance is conveyance speed of the recording material S.

The stiffness acquisition controller 96 controls the stiffness measuring device 410. Specifically, the stiffness acquisition controller 96 controls driving of a recording material pressing motor 451 (see FIG. 5), which will be described later, of the stiffness measuring device 410. Furthermore, the stiffness acquisition controller 96 takes in a detection result of a pressing force detector 432, which will be described later, of the stiffness measuring device 410.

The image formation controller 97 controls image forming operation of the image forming section 240. Furthermore, the image formation controller 97 determines the control parameters for image formation according to the stiffness of the recording material S measured by the stiffness measuring device 410. Specific examples of the control parameters relating to the image formation include the charging potential by the charging section 242, the transfer current supplied to the primary transfer roller 245 and the secondary transfer roller 247, and the fixing temperature and the fixing pressure in the fixing section 248.

<Configuration of Stiffness Measuring Device>

The operation of the stiffness measuring device 410 will be described with reference to FIGS. 4 and 5.

Figure 4:
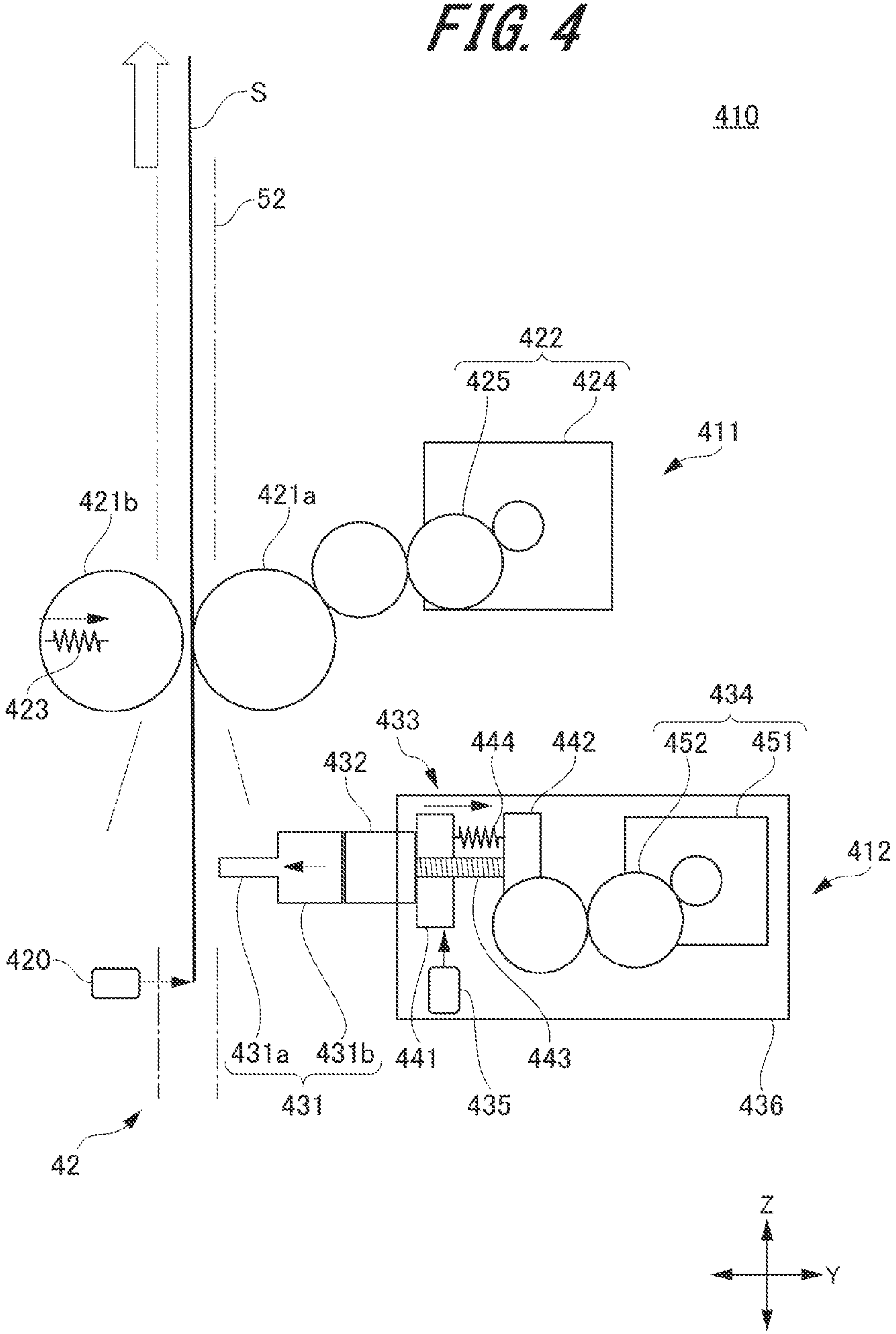
FIG. 4 is a view showing a schematic configuration of a stiffness measuring device according to the first embodiment of the present invention.

FIG. 4 is a diagram illustrating a schematic configuration of the stiffness measuring device 410.

As shown in FIG. 4, the stiffness measuring device 410 is disposed in the second conveyance path 42 through which the second conveying portion 52 conveys the recording material S. In the second conveyance path 42, the conveyance direction of the recording material S is the vertical direction Z. Therefore, the stiffness measuring device 410 measures the stiffness of the recording material S in the middle of being conveyed in a vertical direction Z.

Hereinafter, the conveyance direction of the recording material S is referred to as the vertical direction Z. The direction orthogonal to the recording surface of the recording material S conveyed on the second conveyance path 42 is a horizontal direction Y, and the direction orthogonal to the vertical direction Z and the horizontal direction Y is a recording material width direction X.

The stiffness measuring device 410 includes a recording material holding portion 411 that holds the recording material S and a stiffness measuring section 412 that measures the stiffness of the recording material S held by the recording material holding portion 411.

The recording material holding portion 411 includes a pair of holding rollers 421*a* and 421*b*, a roller driving section 422, and a biasing spring 423.

The rotation axes of the pair of holding rollers 421*a* and 421*b* are parallel to the recording material width direction X. It is preferable that the pair of holding rollers 421*a* and 421*b* also serve as conveying rollers. The roller driving section 422 rotates the holding roller 421*a*. The roller driving section 422 has a holding roller motor 424 and a gear train 425 for transmitting the rotation of the holding roller motor 424 to the holding roller 421*a*.

The biasing springs 423 bias the holding roller 421*b* toward the holding roller 421*a*. The pair of holding rollers 421*a* and 421*b* hold the recording material S by applying a predetermined pressure to sandwich the recording material S. The pair of holding rollers 421*a* and 421*b* holds the recording material S in a posture such that the recording surface is substantially parallel to the vertical direction Z.

The above-described recording material detector 420 is disposed on the second conveyance path 42. The recording material detector 420 detects a lower end of the recording material S when the recording material S is located at the stiffness measurement position. The recording material detector 420 outputs, to the controller 90 (see FIG. 2), the detection result, that is, the fact that the lower end of the recording material S has been detected. Thus, the controller 90 detects that the recording material S is disposed at the stiffness measurement position.

The stiffness measuring section 412 is disposed below the pair of holding rollers 421*a* and 421*b* in the recording material holding portion 411. The stiffness measuring section 412 includes a pressing portion 431, a pressing force detector 432, a support mechanism 433, a moving mechanism 434, a home position sensor 435, and a frame 436. The support mechanism 433, the moving mechanism 434, and the home position sensor 435 are disposed in the frame 436.

The pressing portion 431 presses the lower end portion of the recording material S. The pressing portion 431 includes a blade 431*a* and a base 431*b* that is continuous with one end of the blade 431*a* in the horizontal direction Y. The blade 431*a* is formed in a long plate shape in the recording material width direction X so as to be able to come into contact with the entire width of the recording material S conveyed in the vertical direction Z. The blade 431*a* comes into contact with a measurement point which is a position separated from the lower end of the recording material S toward the upper side in the vertical direction Z by a specific distance. That is, the measurement point is located on a lower side in the vertical direction than the portion of the recording material S held by the recording material holding portion 411.

The pressing force detector 432 is connected to the surface of the pressing portion 431 opposite to the surface of the base 431*b* continuous to the blade 431*a*. The pressing force detector 432 detects a pressing force applied when the pressing portion 431 is pressed in the horizontal direction. That is, the pressing force detector 432 detects a pressing force required for the pressing portion 431 to press and bend the recording material S. As the pressing force detector 432, for example, a load cell pressure sensor can be employed.

The support mechanism 433 supports the pressing portion 431 and the pressing force detector 432 so as to be movable in the horizontal direction Y. The support mechanism 433 includes a detector holding member 441, an abutting member 442, a worm gear 443, and a biasing spring 444. The detector holding member 441 and the abutting member 442 are attached to the frame 436.

The detector holding member 441 is supported by the frame 436 so as to be movable in the horizontal direction Y. Further, the frame 436 is provided with a unillustrated locking portion for locking the rotation of the detector holding member 441 about the axis extending in the horizontal direction Y. The detector holding member 441 holds the pressing force detector 432. A surface of the pressing force detector 432 opposite to the surface connected to the pressing portion 431 is connected to the detector holding member 441.

The abutting member 442 faces the detector holding member 441 in the horizontal direction Y. Further, the abutting member 442 is fixed to the frame 436. The abutting member 442 rotatably supports one end of the worm gear 443.

The rotation axis of the worm gear 443 extends in the horizontal direction Y. The movement of the worm gear 443 in the horizontal direction Y is stopped by the abutting member 442. The other end of the worm gear 443 is screwed into the detector holding member 441. Accordingly, when the worm gear 443 rotates, the detector holding member 441 moves in the horizontal direction.

The biasing spring 444 is connected to the detector holding member 441 and the abutting member 442. The detector holding member 441 is biased toward the abutting member 442 side. As the biasing member 444, for example, a tension coil spring or a compression coil spring can be employed.

Backlash occurs between the detector holding member 441 and the worm gear 443. Therefore, the detector holding member 441 is slightly movable in the horizontal direction Y regardless of the rotation of the worm gear 443. According to the present embodiment, since the biasing spring 444 is provided, the detector holding member 441 does not move toward the abutting member 442 due to the influence of backlash. Thus, when the stiffness of the recording material S is measured, the detector holding member 441 and the pressing portion 431 are not displaced to the abutting member 442 side. As a result, the stiffness of the recording material S can be measured with high accuracy.

The moving mechanism 434 moves the pressing portion 431 in the horizontal direction Y via the support mechanism 433. The moving mechanism 434 includes the recording material pressing motor 451 and a gear train 452 that transmits the rotation of the recording material pressing motor 451 to the worm gear 443. The recording material pressing motor 451 may be, for example, a stepping motor.

The home position sensor 435 detects the home positions of the detector holding member 441 and the pressing portion 431. The home position of the pressing portion 431 is a position at which the pressing portion 431 starts to contact the recording surface of the recording material S. The home position sensor 435 detects the home position of the pressing portion 431 from the position of the detector holding member 441.

The home position of the pressing portion 431 varies depending on the thickness of the recording material S. The association between the thickness of the recording material S and the home position may be made by using table data previously stored in the storage section 98. The pressing force detector 432 detects a pressing force received from the recording material S when the pressing portion 431 moves from the home position to the recording material S side in the horizontal direction Y by a predetermined amount.

The stiffness measuring device 410 includes a measuring section moving mechanism (not illustrated) that moves the stiffness measuring section 412 in the vertical direction Z. The measuring section moving mechanism corresponds to a pressing portion moving mechanism according to the present invention. The position of the pressing portion 431 in the vertical direction Z is changed in accordance with the length of the recording material S in the vertical direction. The length of the recording material S in the vertical direction is the length of the recording material S in the conveyance direction.

Specifically, the measuring section moving mechanism moves the stiffness measuring section 412 and the pressing portion 431 in the vertical direction Z so that the blade 431*a* comes into contact with a position separated from the lower end of the recording material S by a specific distance upward in the vertical direction Z. As a result, when the stiffness of a plurality of types of recording materials S having different lengths in the vertical direction Z are measured, the measurement points at the same distances from the lower ends of the plurality of types of recording materials S can be pressed by the blade 431*a*. As a result, the stiffness of a plurality of types of recording materials S having different lengths in the vertical direction Z can be measured under the same conditions.

The pressing portion moving mechanism according to the present invention may be a mechanism that moves the pressing portion 431 and the pressing force detector 432 on the detector holding member 441. Furthermore, in the stiffness measuring device according to the present invention, the pair of holding rollers 421*a* and 421*b* may be moved in the vertical direction so that the blade 431*a* comes into contact with a position separated from the lower end of the recording material S upward in the vertical direction Z by a specific distance.

<Functional Configuration of Stiffness Measuring Device>

Next, a functional configuration of the stiffness measuring device 410 will be described with reference to FIG. 5.

Figure 5:
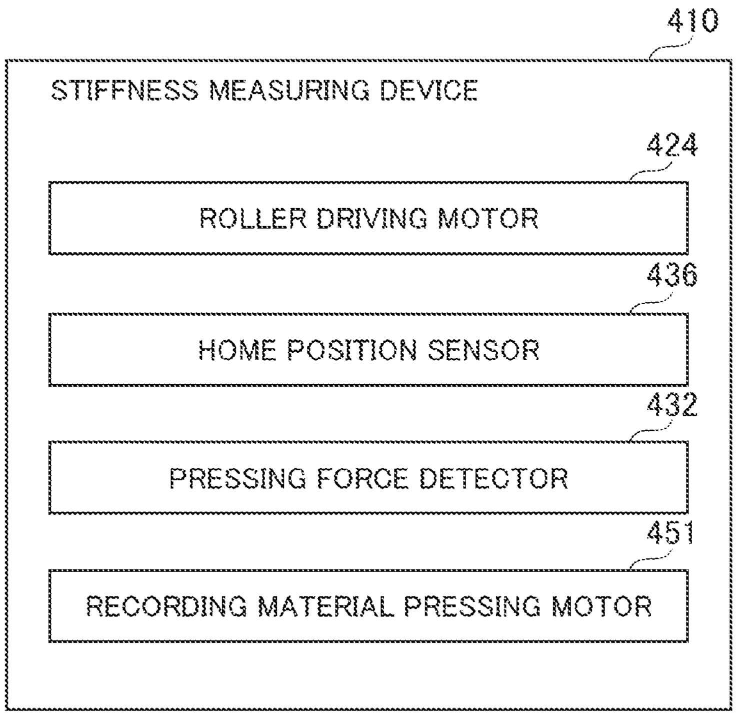
FIG. 5 is a block diagram showing a configuration example of a control system of the stiffness measuring device according to the first embodiment of the present invention.

FIG. 5 is a block diagram illustrating a configuration example of a control system of the stiffness measuring device 410.

As illustrated in FIG. 5, the stiffness measuring device 410 includes the holding roller motor 424, the pressing force detector 432, the home position sensor 435, and the recording material pressing motor 451.

The holding roller motor 424, the pressing force detector 432, the home position sensor 435, and the recording material pressing motor 451 are electrically connected to the controller 90 by wire or wirelessly.

The holding roller motor 424, the pressing force detector 432, the home position sensor 435, and the recording material pressing motor 451 are controlled by the stiffness acquisition controller 96 of the controller 90. In the case where the pair of holding rollers 421*a* and 421*b* (see FIG. 5) also serves as the conveying rollers, the holding roller motor 424 may be controlled by the conveyance controller 95 (see FIG. 3).

The stiffness measuring device 410 acquires the stiffness of the recording material S by operating as follows.

First, the stiffness acquisition controller 96 of the controller 90 receives a detection result of the recording material detector 420 (see FIG. 5) to detect the fact that the recording material S is disposed at the stiffness measurement position. Then, the stiffness acquisition controller 96 controls the driving of the holding roller motor 424 to cause the pair of holding rollers 421*a* and 421*b* to hold the recording material S disposed at the stiffness measurement position. At this time, the pair of holding rollers 421*a* and 421*b* hold the recording material S over the entire width in the recording material width direction X.

The recording material S held by the pair of holding rollers 421*a* and 421*b* is in a posture in which the recording surface is substantially perpendicular to the horizontal direction Y. Thus, the direction in which the recording material S is pressed is the horizontal direction Y, and the effect of gravity can be minimized when the recording material S is pressed. As a result, the stiffness of the recording material S can be measured with high accuracy.

Next, the stiffness acquisition controller 96 controls the driving of the recording material pressing motor 451 to move the pressing portion 431 and the pressing force detector 432 in the horizontal direction Y via the detector holding member 441.

Accordingly, the pressing portion 431 starts to come into contact with the recording surface of the recording material S. At this time, the home position sensor 435 detects the position of the detector holding member 441 and outputs the detection result to the controller 90.

Accordingly, the stiffness acquisition controller 96 detects the home positions of the pressing portion 431 and the detector holding member 441.

Next, the stiffness acquisition controller 96 controls the driving of the recording material pressing motor 451 to move the pressing portion 431 from the home position to a predetermined distance. The predetermined distance is, for example, 3 mm. Thus, the pressing portion 431 presses and bends the recording material S. At this time, the pressing force detector 432 detects the pressing force received from the recording material S, and outputs the detection result to the controller 90. Thus, the stiffness acquisition controller 96 acquires the pressing force detected by the pressing force detector 432 as the stiffness of the recording material S.

After the stiffness of the recording material S is acquired, the stiffness acquisition controller 96 releases the recording material S from the pressing state by the pressing portion 431. That is, the stiffness acquisition controller 96 controls the driving of the recording material pressing motor 451 to move the pressing portion 431 to the abutting member 442 (see FIG. 5) side from the home position. Thus, the pressing state of the recording material S by the pressing portion 431 is released.

<Parameter Setting Processing>

Next, parameter setting processing of the image forming system 10 according to the present embodiment will be described with reference to FIG. 6.

Figure 6:
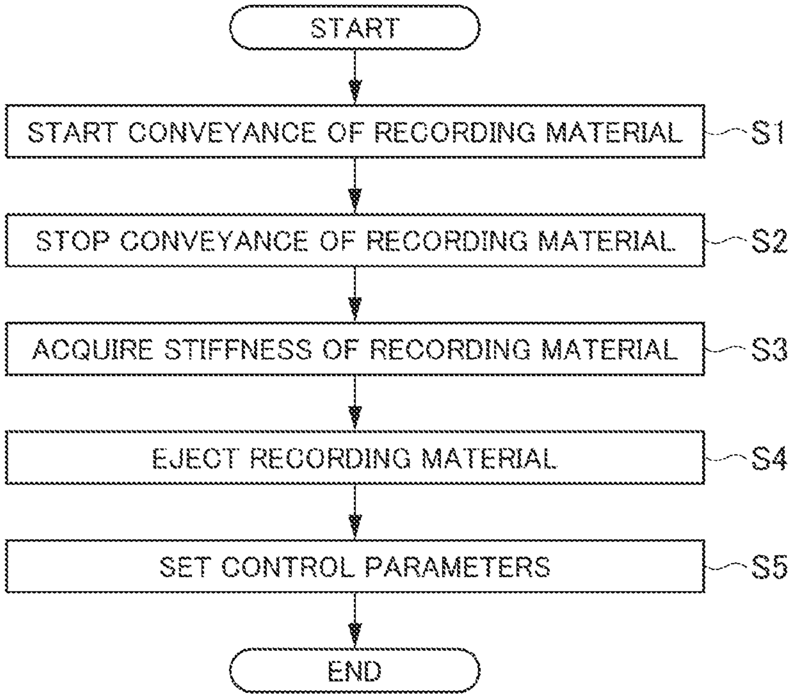
FIG. 6 is a flowchart showing a procedure of parameter setting processing of the image forming system according to the first embodiment of the present invention.

FIG. 6 is a flowchart showing the procedure of the parameter setting processing of the image forming system 10.

First, when the print job is started, the conveyance controller 95 controls the driving of the conveying portion 50 to take out the recording material S designated by the print job from the recording material feeding section 70. Then, the conveyance controller 95 controls the driving of the first conveying portion 51 and the second conveying portion 52 to convey the recording material S along the second conveyance path 42 of the recording material conveying device 400 (S1).

Next, when the lower end of the recording material S in the second conveyance path 42 is detected by the recording material detector 420, the conveyance controller 95 controls the driving of the second conveying portion 52 to stop the conveyance of the recording material S (S2). Thus, the recording material S stops at the stiffness measurement position. Then, the stiffness acquisition controller 96 stops the driving of the holding roller motor 424 and causes the pair of holding rollers 421*a* and 421*b* to hold the recording material S arranged at the stiffness measurement position.

Next, the stiffness acquisition controller 96 operates the stiffness measuring section 412 of the stiffness measuring device 410 to obtain the stiffness of the recording material S (S3). At this time, the stiffness acquisition controller 96 controls driving of the recording material pressing motor 451 to cause the pressing portion 431 to press the recording material S in the horizontal direction Y. Then, the pressing force detector 432 detects the pressing force received from the recording material S pressed and bent by the pressing by the pressing portion 431, and the stiffness acquisition controller 96 takes in the detection result. Thus, the stiffness of the recording material S is acquired.

Then, the conveyance controller 95 controls the driving of the second conveying portion 52 to eject the recording material S whose stiffness has been measured from the ejection portion 56 (S4). At this time, the stiffness acquisition controller 96 drives the holding roller motor 424 to release the holding of the recording material S by the pair of holding rollers 421*a* and 421*b*.

Next, the controller 90 sets the control parameters based on the stiffness of the recording material S (S5). The association between the stiffness of the recording material S and the control parameters may be made by using table data previously stored in the storage section 98. That is, the controller 90 reads, from the storage section 98, the control parameters corresponding to the measured stiffness of the recording material S.

The control parameters to be set includes at least one of a conveyance parameter of the recording material, a curl correction parameter of the recording material, an image forming parameter, and a post-processing parameter.

Specific examples of the conveyance parameter of the recording material include the conveyance speed. Specific examples of the curl correction parameter of the recording material include the pressure applied to the recording material by the curl correction roller and the contact time between the curl correction roller and the recording material. Specific examples of the image forming parameters include the charging potential by the charging section 242, the transfer current supplied to the primary transfer roller 245 and the secondary transfer roller 247, and the fixing temperature and the fixing pressure in the fixing section 248. Specific examples of the post-processing parameter include the driving pressure for performing staple processing, the driving torque for performing sheet folding processing, and the like.

The conveyance parameter and the curl correction parameter are parameters set by the conveyance controller 95. The image forming parameter is a parameter set by the image formation controller 97. The post-processing parameter is a parameter set by a non-illustrated post-processing controller included in the controller 90. The control parameter set in step S5 may be a control parameter other than the control parameters mentioned here.

2. Second Embodiment

A stiffness measuring device according to a second embodiment of the present invention will be described below with reference to FIG. 7.

Figure 7:
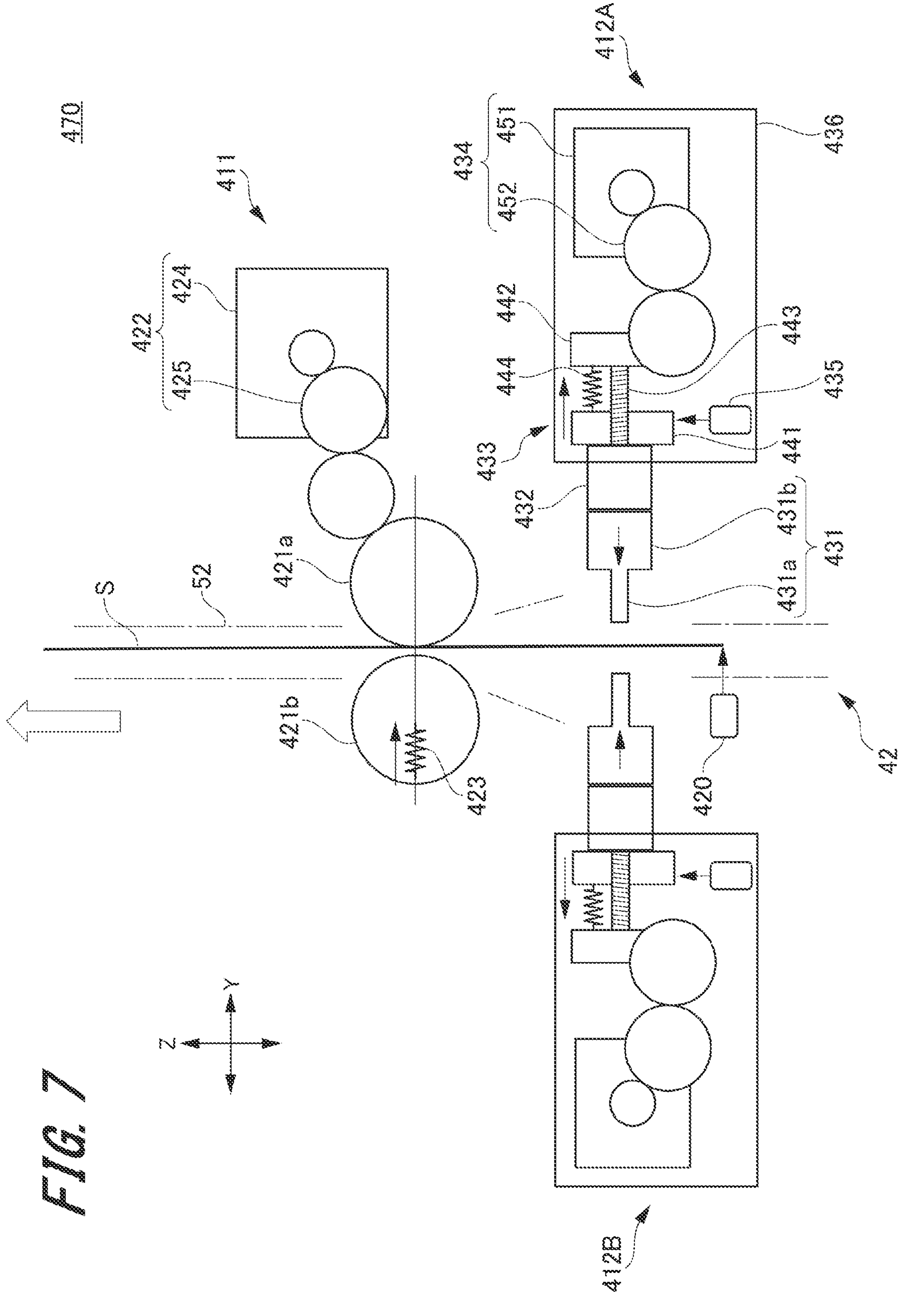
FIG. 7 is a view illustrating a schematic configuration of a stiffness measuring device according to a second embodiment of the present invention.

FIG. 7 is a diagram showing a schematic configuration of the stiffness measuring device according to the second embodiment.

As illustrated in FIG. 7, in a stiffness measuring device 470 according to the second embodiment, a second conveying portion 52 is disposed in a second conveyance path 42 through which the recording material S is conveyed. The stiffness measuring device 470 measures the stiffness of a recording material S being conveyed in the vertical direction Z. The stiffness measuring device 470 includes a recording material holding portion 411 for holding the recording material S, and stiffness measuring sections 412A and 412B for measuring the stiffness of the recording material S held by the recording material holding portion 411.

Since the configuration of the recording material holding portion 411 is the same as that of the recording material holding portion 411 according to the first embodiment, descriptions thereof will be omitted. The stiffness measuring sections 412A and 412B face each other in the horizontal direction Y with the recording material S disposed at the stiffness measurement position therebetween. Since the configurations of the stiffness measuring sections 412A and 412B are the same as those of the stiffness measuring section 412 according to the first embodiment, the description thereof will be omitted.

The recording material S has a first recording surface and a second recording surface. The first recording surface is, for example, a front surface, and the second recording surface is, for example, a back surface. A stiffness measuring section 412A faces the second recording surface of the recording material S. The stiffness measuring section 412A presses the second recording surface of the recording material S to measure the stiffness of the first recording surface of the recording material S. A pressing portion 431 of the stiffness measuring section 412A corresponds to a first pressing portion according to the present invention. A pressing force detector 432 of the stiffness measuring section 412A corresponds to a first stiffness acquiring section according to the present invention.

A stiffness measuring section 412B faces the first recording surface of the recording material S. The stiffness measuring section 412B presses the first recording surface of the recording material S and measures the stiffness of the second recording surface of the recording material S. A pressing portion 431 of the stiffness measuring section 412B corresponds to a second pressing portion according to the present invention. A pressing force detector 432 of the stiffness measuring section 412B corresponds to a second stiffness acquiring section according to the present invention.

The stiffness measuring device 470 according to the second embodiment can measure the stiffness of the first recording surface and the second recording surface of the recording material S disposed at the stiffness measurement position. Therefore, for example, it is effective in the case of double-sided printing.

When it is desired to measure the stiffness of the first recording surface and the second recording surface of the recording material S by one stiffness measuring section, it is necessary to reverse the recording material S and convey it to the stiffness measurement position again. On the other hand, the stiffness measuring device 470 according to the second embodiment does not needs to reverse the recording material S, and can shorten the time required to measure the stiffness of the first recording surface and the second recording surface of the recording material S.

3. Modification Examples

In the stiffness measuring devices 410 and 470 of the first and second embodiments the pressing portion 431 is configured to press the measurement point of the recording material S. However, the pressing portion according to the present invention may be connected to the measurement point of the recording material S to pull the recording material S. The stiffness acquiring section in this case detects the reaction force when the recording material S is pulled. The reaction force when the recording material S is pulled may be rephrased as tensile force. Also in this case, the stiffness of the recording material S can be measured. Examples of the pressing portion connected to the measurement point of the recording material include a pressing portion formed into a frame shape having a through hole through which the lower end portion of the recording material passes and a pressing portion having a suction portion for sucking the recording material.

Further, the pressing portion according to the present invention may be configured to be capable of pressing the measurement point of the recording material S and capable of pulling the measurement point of the recording material S. The stiffness acquiring section in this case detects a reaction force generated when the recording material S is pressed and a reaction force generated when the recording material S is pulled. As a result, the stiffness of the first recording surface and the second recording surface of the recording material S can be measured using one pressing portion without reversing the recording material S.

4. Summary

As described above, the stiffness measuring device 410 according to the first embodiment includes the recording material holding portion 411, the pressing portion 431, and the pressing force detector 432. The recording material holding portion 411 holds the recording material S in a posture in which the recording surface is substantially parallel to the vertical direction Z. The pressing portion 431 presses the measurement point located on a lower side in the vertical direction Z than the portion of the recording material S held by the recording material holding portion 411. The pressing force detector 432 measures the reaction force obtained when the measurement point is pressed by the recording material holding portion 411, and acquires the measured reaction force as the stiffness of the recording material. The recording material holding portion 411 corresponds to the holding section according to the present invention, and the pressing force detector 432 corresponds to the stiffness acquiring section according to the present invention.

As a result, the stiffness of the recording material S can be acquired in a state in which the effect of gravity is minimized. As a result, the stiffness of the recording material S can be measured with high accuracy.

Further, the measurement point according to the above-described first embodiment is an end portion of the recording material S. Thus, the effect of the gravity can be minimized.

Further, the pressing portion 431 according to the above-described first embodiment presses the measurement point in the horizontal direction Z.

Accordingly, the pressing portion 431 can reliably press the recording material S whose recording surface is substantially parallel to the vertical direction Z. The pressing force detector 432 can accurately acquire the relationship between the pressing distance to the recording material S and the reaction force of the recording material S. As a result, the pressing force detector 432 can accurately detect the reaction force of the recording material S.

In addition, the recording material holding portion 411 according to the above-described first embodiment stops the recording material S.

Accordingly, the reaction force of the recording material S can be accurately detected.

In addition, the stiffness measuring device 410 according to the above-described first embodiment includes the pressing portion moving mechanism that moves the pressing portion 431. The position of the pressing portion 431 in the vertical direction Z is changed in accordance with the length of the recording material S in the vertical direction Z.

Thus, when the stiffness of a plurality of types of recording materials S having different lengths in the vertical direction Z is measured, the measurement points at the same distance from the lower ends of the plurality of types of recording materials S can be pressed by the pressing portion 431. As a result, the stiffness of a plurality of types of recording materials S having different lengths in the vertical direction Z can be measured under the same conditions.

In addition, the pressing portion according to the above-described modification example may press the measurement point or may be connected to the measurement point and pull the measurement point. The stiffness acquiring section according to the modification example measures the reaction force in each of the case where the pressing portion presses the measurement point and the case where the pressing portion pulls the measurement point, and acquires the stiffness of the both recording surfaces of the recording material.

Thus, the stiffness of the both recording surfaces of the recording material can be measured by using one pressing portion without reversing the recording material.

In addition, the stiffness measuring device 470 according to the above-described second embodiment includes the pressing portion 431 of the stiffness measuring section 412A which presses the first recording surface of the recording material S and the pressing portion 431 of the stiffness measuring section 412B which presses the second recording surface of the recording material S. Further, the stiffness measuring device 470 includes the pressing force detector 432 of the stiffness measuring section 412A that measures the reaction force via the pressing portion 431 of the stiffness measuring section 412A, and the pressing force detector 432 of the stiffness measuring section 412B that measures the reaction force via the pressing portion 431 of the stiffness measuring section 412B. Thus, the stiffness of the first recording surface and the stiffness of the second recording surface of the recording material S are acquired. The pressing portion 431 of the stiffness measuring section 412A corresponds to the first pressing portion according to the second embodiment of the present invention, and the pressing portion 431 of the stiffness measuring section 412B corresponds to the second pressing portion according to the second embodiment of the present invention. The pressing force detector 432 of the stiffness measurement unit 412A corresponds to the first stiffness acquiring section according to the present invention, and the pressing force detector 432 of the stiffness measuring section 412B corresponds to the stiffness acquisition section according to the present invention.

Thus, the stiffness of the first recording surface and the stiffness of the second recording surface can be acquired without reversing the recording material S. As a result, the time required for measuring the stiffness of the first recording surface and the second recording surface of the recording material S can be shortened.

In addition, the image forming system 10 according to the above-described first embodiment includes the image forming section 240 which forms an image on the recording material S, the recording material feeding section 70 which can store the recording material, and the second conveyance path 42 which is provided between the recording material feeding section 70 and the image forming section 240. The image forming system 10 further includes a stiffness measuring device 410 that is disposed in the second conveyance path 42 and measures the stiffness of the recording material S, and the controller 90 that sets the image forming parameter in accordance with the measurement result of the stiffness measuring device 410. The stiffness measuring device 410 includes the recording material holding portion 411, the pressing portion 431, and the pressing force detector 432. The recording material holding portion 411 holds the recording material S in a posture in which the recording surface is substantially parallel to the vertical direction Z. The pressing portion 431 presses the measurement point located on a lower side in the vertical direction Z than the portion of the recording material S held by the recording material holding portion 411. The pressing force detector 432 measures the reaction force obtained when the measurement point is pressed by the recording material holding portion 411, and acquires the measured reaction force as the stiffness of the recording material. The recording material feeding section 70 corresponds to the recording material storage portion according to the present invention, and the second conveyance path 42 corresponds to the recording material conveyance path according to the present invention.

As a result, the stiffness of the recording material S can be acquired in a state in which the effect of gravity is minimized. As a result, the stiffness of the recording material S can be measured with high accuracy.

In addition, in the stiffness measuring method according to the above-described first embodiment, the recording material S in a posture in which the recording surface is substantially parallel to the vertical direction is held by the recording material holding portion 411, and the pressing portion 431 presses the measurement point located on a lower side in the vertical direction Z than the portion of the recording material S held by the recording material holding portion 411. Then, the pressing force detector 432 measures the reaction force obtained when the measurement point is pressed by the pressing portion 431, and acquires the measured reaction force as the stiffness of the recording material.

As a result, the stiffness of the recording material S can be acquired in a state in which the effect of gravity is minimized. As a result, the stiffness of the recording material S can be measured with high accuracy.

The embodiments of the stiffness measuring device and the image forming system according to the present invention have been described above including the effects thereof. However, the stiffness measuring device and the image forming system of the present invention are not limited to the above-described embodiments, and various modification implementations are possible within a scope that does not depart from the gist of the invention described in the claims.

Furthermore, the above-described embodiments have been described in detail in order to describe the present invention in an easy-to-understand manner, and is not necessarily limited to one including all of the described configurations. Furthermore, a part of the configuration of one embodiment can be replaced with the configuration of another embodiment, and the configuration of one embodiment can be added with the configuration of another embodiment. In addition, some of the configurations of each embodiment may be added to, omitted from, and replaced with other configurations.

For example, in the image forming system 10 of the above-described embodiments, the stiffness measuring device 410 is provided in the recording material conveying device 400. However, the position where the stiffness measuring device according to the present invention is provided can be appropriately set as long as it is on the upstream of the image forming section in the conveyance direction of the recording material. The stiffness measuring device according to the present invention may be provided in, for example, the image forming apparatus 200 or the recording material feeding device 100.

DESCRIPTION OF THE REFERENCE NUMERALS

10—image forming system, 41—first conveyance path, 42—second conveyance path, 43—third conveyance path, 50—conveying portion, 51—first conveying portion, 52—second conveying portion, 53—third conveying portion, 54—conveying rollers, 55—carry-in port, 56—ejection portion, 57—carry out port, 58—branching portion, 70—recording material feeding section, 80—image processing unit, 90—controller, 91—CPU, 92—ROM, 93—RAM, 94—sheet feed controller, 95—conveyance controller, 96—stiffness acquisition controller, 97—image formation controller, 98—storage section, 99—communication unit, 100—recording material feeding device, 200—image forming apparatus, 220—operation display unit, 230—scanner, 240—image forming section, 300—post-processing device, 400—recording material conveying device, 410,470—stiffness measuring device, 411—recording material holding portion, 412, 412A, 412B—stiffness measuring section, 420—recording material detector, 421*a*, 421*b*—holding roller, 422—roller driving section, 424—holding roller motor, 425—gear train, 431—pressing portion, 431*a* blade, 431*b*—base, 432—pressing force detector, 433—support mechanism, 434—moving mechanism, 435—home position sensor, 436—frame, 441—detector holding member, 442—abutting member, 443—worm gear, 451—recording material pressing motor, 452—gear train

The invention claimed is:

1. A stiffness measuring device comprising:

a holding portion that holds a recording material so that a recording surface of the recording material is substantially parallel to a vertical direction;

a pressing portion that presses a measurement point located on a lower side in the vertical direction with respect to a portion of the recording material held by the holding portion;

a stiffness acquiring section that measures a reaction force obtained when the measurement point is pressed by the pressing portion and acquires the measured reaction force as a stiffness of the recording material; and a pressing portion moving mechanism that moves the pressing portion, wherein a position of the pressing portion in the vertical direction is changeable in accordance with a length of the recording material in the vertical direction.

2. The stiffness measuring device according to claim 1, wherein the measurement point is an end portion of the recording material.

3. The stiffness measuring device according to claim 1, wherein the pressing portion presses the measurement point in a horizontal direction.

4. The stiffness measuring device according to claim 1, wherein the holding portion sets the recording material to a stopped state.

5. The stiffness measuring device according to claim 1, wherein:

the pressing portion includes a first pressing portion configured to press a first recording surface of the recording material and a second pressing portion configured to press a second recording surface of the recording material, and the stiffness acquiring section includes a first stiffness acquiring section that measures a reaction force via the first pressing portion and a second stiffness acquiring section that measures a reaction force via the second pressing portion, and acquires the stiffness of the first recording surface and the stiffness of the second recording surface.

6. An image forming system comprising:

an image forming section that forms an image on a recording material;

a recording material storage portion capable of storing the recording material;

a recording material conveyance path provided between the recording material storage portion and the image forming section;

a stiffness measuring device that is disposed in the recording material conveyance path and measures a stiffness of the recording material; and a controller configured to set an image forming parameter in accordance with a measurement result of the stiffness measuring device;

wherein the stiffness measuring device comprises:

a holding portion that holds the recording material so that a recording surface of the recording material is substantially parallel to a vertical direction;

a pressing portion that presses a measurement point located on a lower side in the vertical direction with respect to a portion of the recording material held by the holding portion;

a stiffness acquiring section that measures a reaction force obtained when the measurement point is pressed by the pressing portion and acquires the measured reaction force as the measurement result of the stiffness measuring device; and a pressing portion moving mechanism that moves the pressing portion, wherein a position of the pressing portion in the vertical direction is changeable in accordance with a length of the recording material in the vertical direction.

7. A stiffness measuring method comprising:

holding a recording material so that a recording surface of the recording material is substantially parallel to a vertical direction;

pressing, by a pressing portion, presses a measurement point located on a lower side in the vertical direction with respect to a portion of the recording material held by the holding portion; and measuring a reaction force obtained when the measurement point is pressed, and acquiring the measured reaction force as the stiffness of the recording material;

wherein the method further comprises changing a position of the pressing portion in the vertical direction in accordance with a length of the recording material in the vertical direction.

8. A stiffness measuring device comprising:

a holding portion that holds a recording material so that a recording surface of the recording material is substantially parallel to a vertical direction;

a first pressing portion configured to press a first measurement point of a first recording surface of the recording material and a second pressing portion configured to press a second measurement point of a second recording surface of the recording material, wherein both the first measurement point and the second measurement point are located on a lower side in the vertical direction with respect to a portion of the recording material held by the holding portion; and a first stiffness acquiring section that measures a reaction force obtained when the first measurement point is pressed by the first pressing portion, and a second stiffness acquiring section that measures a reaction force obtained when the second measurement point is pressed by the second pressing portion, to acquire a stiffness of the first recording surface and the stiffness of the second recording surface.

9. A stiffness measuring device comprising:

a holding portion that holds a recording material so that a recording surface of the recording material is substantially parallel to a vertical direction;

a pulling portion that connects to a measurement point of the recording material and pulls the measurement point, wherein the measurement point is located on a lower side in the vertical direction with respect to a portion of the recording material held by the holding portion; and a stiffness acquiring section that measures a reaction force obtained when the measurement point is pulled by the pulling portion and acquires the measured reaction force as a stiffness of the recording material.

10. A stiffness measuring device comprising:

a holding portion that holds a recording material so that a recording surface of the recording material is substantially parallel to a vertical direction;

a pressing portion;

a support mechanism that comprises a holding member that supports the pressing portion and a driving mechanism that drives the pressing portion to press a measurement point located on a lower side in the vertical direction with respect to a portion of the recording material held by the holding portion;

a pressing force detector positioned between the pressing portion and the holding member of the supporting mechanism, wherein the pressing force detector detects a pressing force applied when the pressing portion presses the measurement point; and a controller that acquires the pressing force detected by the pressing force detector as a stiffness of the recording material.

11. The stiffness measuring device according to claim 10, wherein the pressing force detector comprises a load cell.

* * * * *